(12) United States Patent
Nakanishi et al.

(10) Patent No.: US 10,822,678 B2
(45) Date of Patent: *Nov. 3, 2020

(54) NON-ORIENTED ELECTRICAL STEEL SHEET AND METHOD FOR PRODUCING THE SAME

(71) Applicant: JFE STEEL CORPORATION, Tokyo (JP)

(72) Inventors: Tadashi Nakanishi, Tokyo (JP); Hiroaki Nakajima, Tokyo (JP); Tomoyuki Okubo, Tokyo (JP); Yoshihiko Oda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 399 days.

This patent is subject to a terminal disclaimer.

(21) Appl. No.: 15/541,964

(22) PCT Filed: Nov. 17, 2015

(86) PCT No.: PCT/JP2015/082191
§ 371 (c)(1),
(2) Date: Jul. 6, 2017

(87) PCT Pub. No.: WO2016/111088
PCT Pub. Date: Jul. 14, 2016

(65) Prior Publication Data
US 2018/0002789 A1  Jan. 4, 2018

(30) Foreign Application Priority Data

Jan. 7, 2015 (JP) .................................. 2015-001531
Oct. 16, 2015 (JP) .................................. 2015-204268

(51) Int. Cl.
*C22C 38/06* (2006.01)
*C22C 38/00* (2006.01)
(Continued)

(52) U.S. Cl.
CPC ............ *C22C 38/002* (2013.01); *C21C 7/064* (2013.01); *C21D 8/1205* (2013.01);
(Continued)

(58) Field of Classification Search
CPC .. C21D 8/1222; C21D 8/1233; C21D 8/1272; C22C 38/00; H01F 1/16; H01F 1/342; Y02P 10/216
(Continued)

(56) References Cited

U.S. PATENT DOCUMENTS 6,582,528 B1  6/2003  Bohm et al.
7,470,333 B2  12/2008  Ohashi et al.
(Continued)

FOREIGN PATENT DOCUMENTS

CA  2956686 A1  2/2016
CA  2825852 C   4/2016
(Continued)

OTHER PUBLICATIONS

NPL: English abstract of JP 10060532A, Mar. 1998. (Year: 1998).*
(Continued)

*Primary Examiner* — Jie Yang
(74) *Attorney, Agent, or Firm* — RatnerPrestia (57) ABSTRACT

When a non-oriented electrical steel sheet is produced by hot rolling a slab containing, by mass %, C: not more than 0.0050%, Si: 1.5-5.0%, Mn: 0.20-3.0%, sol. Al: not more than 0.0050%, P: not more than 0.2%, S: not more than 0.0050% and N: not more than 0.0040% to form a hot rolled sheet, cold rolling the hot rolled sheet without conducting a hot band annealing and then subjecting to a finish annealing, a compositional ratio of CaO in oxide-based inclusions existing in the slab defined by $CaO/(SiO_2+Al_2O_3+CaO)$ is set to not less than 0.4 and/or a compositional ratio of $Al_2O_3$ defined by $Al_2O_3/(SiO_2+Al_2O_3+CaO)$ is set to not less than
(Continued)

0.3, and a coiling temperature in the hot rolling is set to not lower than 650° C.

9 Claims, 1 Drawing Sheet

(51) Int. Cl.
| | |
|---|---|
| H01F 1/16 | (2006.01) |
| C21D 8/12 | (2006.01) |
| C21C 7/064 | (2006.01) |
| C22C 38/16 | (2006.01) |
| C22C 38/08 | (2006.01) |
| C22C 38/60 | (2006.01) |
| C22C 38/34 | (2006.01) |
| C22C 38/18 | (2006.01) |
| C22C 38/02 | (2006.01) |
| C22C 38/04 | (2006.01) |
| H01F 1/34 | (2006.01) |

(52) U.S. Cl.
CPC ............ *C21D 8/1233* (2013.01); *C22C 38/00* (2013.01); *C22C 38/001* (2013.01); *C22C 38/004* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/16* (2013.01); *C22C 38/18* (2013.01); *C22C 38/34* (2013.01); *C22C 38/60* (2013.01); *H01F 1/16* (2013.01); *H01F 1/342* (2013.01); *C21D 8/1222* (2013.01); *C21D 8/1272* (2013.01); *Y02P 10/20* (2015.11)

(58) Field of Classification Search
USPC ........................................................ 148/307
See application file for complete search history.

(56) References Cited

U.S. PATENT DOCUMENTS

| | | | |
|---|---|---|---|
| 7,662,242 | B2 | 2/2010 | Miyazaki et al. |
| 8,052,811 | B2 | 11/2011 | Kurosaki et al. |
| 10,006,109 | B2* | 6/2018 | Nakanishi ............... C21D 8/12 |
| 2006/0266448 | A1 | 11/2006 | Arai et al. |
| 2007/0023103 | A1 | 2/2007 | Schoen et al. |
| 2009/0202383 | A1 | 8/2009 | Tanaka et al. |
| 2014/0345751 | A1 | 11/2014 | Oda et al. |
| 2016/0203895 | A1 | 8/2016 | Nakanishi et al. |

FOREIGN PATENT DOCUMENTS

| | | |
|---|---|---|
| CA | 2903035 C | 10/2017 |
| CA | 2884851 C | 1/2018 |
| CN | 101139681 A | 3/2008 |
| CN | 101812629 A | 8/2010 |
| CN | 102796947 A | 11/2012 |
| CN | 103827333 A | 5/2014 |
| JP | 0680169 B2 | 10/1994 |
| JP | 2500033 B2 | 5/1996 |
| JP | 08144008 A | 6/1996 |
| JP | 10060532 A * | 3/1998 |
| JP | 10102219 A | 4/1998 |
| JP | H11158548 A | 6/1999 |
| JP | 2001158949 A | 6/2001 |
| JP | 3348398 B2 | 11/2002 |
| JP | 3378934 B2 | 2/2003 |
| JP | 2004149823 A | 5/2004 |
| JP | 3964964 B2 | 8/2007 |
| JP | 4126479 B2 | 7/2008 |
| JP | 2009185386 A | 8/2009 |
| JP | 2013082973 A | 5/2013 |
| JP | 2013112853 A | 6/2013 |
| KR | 20010028403 A | 4/2001 |
| KR | 20020018226 A | 3/2002 |
| KR | 1020050060869 A | 6/2005 |
| RU | 2311479 C2 | 11/2007 |
| RU | 2362829 C2 | 7/2009 |
| RU | 2398894 C1 | 9/2010 |
| RU | 2400325 C1 | 9/2010 |
| TW | 200606262 A | 2/2006 |
| TW | 201329244 A | 7/2013 |
| TW | 201331384 A | 8/2013 |
| WO | 0065103 A2 | 11/2000 |
| WO | 2013080891 A1 | 6/2013 |
| WO | 2015025758 A1 | 2/2015 |

OTHER PUBLICATIONS

Korean Office Action for Korean Application No. 10-2017-7018621, dated Sep. 3, 2018, with Concise Statement of Relevance of Office Action, 6 pages.
Chinese Office Action for Application No. 201580072499.X, dated Apr. 4, 2018 with English search report, 8 pages.
Canadian Office Action for Canadian Application No. 2,971,682, dated Jul. 9, 2018, 4 pages.
Russian Office Action for Russian Application No. 2017127961, dated Jun. 28, 2018, with translation, 8 pages.
International Search Report and Written Opinion for International Application No. PCT/JP2015/082191, dated Feb. 23, 2016—5 Pages.
Extended European Search Report for European Application No. 15876961.2, dated Dec. 13, 2017, 8 pages.
Final Office Action for U.S. Appl. No. 14/909,940, dated Oct. 5, 2017, 13 pages.
Non Final Office Action for U.S. Appl. No. 14/909,940, dated Aug. 18, 2016, 10 pages.
Final Office Action for U.S. Appl. No. 14/909,940, dated Dec. 20, 2016, 13 pages.
Non Final Office Action for U.S. Appl. No. 14/909,940, dated May 19, 2017, 9 pages.

* cited by examiner

NON-ORIENTED ELECTRICAL STEEL SHEET AND METHOD FOR PRODUCING THE SAME

CROSS REFERENCE TO RELATED APPLICATIONS

This is the U.S. National Phase application of PCT/JP2015/082191, filed Nov. 17, 2015, which claims priority to Japanese Patent Application No. 2015-001531, filed Jan. 7, 2015 and Japanese Patent Application No. 2015-204268, filed Oct. 16, 2015, the disclosures of these applications being incorporated herein by reference in their entireties for all purposes.

TECHNICAL FIELD OF THE INVENTION

This invention relates to a non-oriented electrical steel sheet used as an iron core material for an electric equipment or the like and a method for producing the same.

BACKGROUND OF THE INVENTION

Recently, a motor used for a household air conditioner or the like is demanded to be low in the power consumption and small in the energy loss with an increasing interest in energy-saving. To this end, a non-oriented electrical steel sheet used as an iron core material of the motor is strongly required to have high-performance properties, for example, a low iron loss for reducing an iron loss of the motor and a high magnetic flux density for reducing a copper loss of the motor.

As a method of reducing the iron loss of the non-oriented electrical steel sheet has hitherto been adopted a method of reducing an eddy current loss by increasing an addition amount of an element increasing specific resistance of steel such as Si, Al, Mn or the like. In this method, however, the decrease of the magnetic flux density is inescapable. So, some techniques of increasing the magnetic flux density of the non-oriented electrical steel sheet are proposed in addition to the reduction of the iron loss.

For example, Patent Document 1 proposes a technique for increasing a magnetic flux density by adding Sb or Sn to a slab containing, by weight %, C: not more than 0.02%, Si or Si+Al: not more than 4.0%, Mn: not more than 1.0% and P: not more than 0.2%. In this technique, however, scattering of the magnetic properties cannot be sufficiently reduced and it is further necessary to conduct two cold rollings sandwiching a short time annealing therebetween after hot rolling, and therefore there is a problem that the production cost is increased.

Also, Patent Document 2 proposes a technique wherein a compositional ratio of MnO in oxide-based inclusions ($MnO/(SiO_2+Al_2O_3+CaO+MnO)$) existent in a hot rolled steel sheet containing, by weight %, C≤0.008%, Si≤4%, Al≤2.5%, Mn≤1.5%, P≤0.2%, S≤0.005% and N≤0.003% is controlled to not more than 0.35 to decrease the number of inclusions extended in the rolling direction and improve crystal grain growth. However, this technique has a problem that if Mn content is low, magnetic properties, particularly iron loss property are rather deteriorated due to precipitation of a sulfide such as fine MnS or the like.

Recently, from a viewpoint of recycling iron resources, scraps generated in the punching process of the iron core material are increasingly reused as a raw material for foundry pig. However, when Al content in the foundry pig is not less than 0.05 mass %, blowholes (shrinkage cavities) are easily caused in a casting, so that it is desired to limit the Al content in the scrap to less than 0.05 mass %.

As regard to a non-oriented electrical steel sheet containing a decreased Al content, for example, Patent Document 3 proposes a technique of improving a texture and increasing a magnetic flux density by decreasing Al content to not more than 0.017 mass %, preferably to not more than 0.005 mass %. In this technique, however, a single rolling process at room temperature is adopted as a cold rolling, so that an effect of sufficiently increasing the magnetic flux density cannot be obtained. This problem is solved by adopting two or more cold rollings sandwiching an intermediate annealing therebetween as the cold rolling, but there is caused another problem that the production cost is increased. When the cold rolling is a so-called warm rolling by raising a sheet temperature to about 200° C., it is effective to increase the magnetic flux density, but there is a problem that it is necessary to use a new equipment or a process control for such an object. Further, Patent Document 3 discloses that when only Al is decreased but N is not decreased, AlN is finely precipitated during the cooling in hot band annealing to suppress the grain growth in the recrystallization annealing and deteriorate the iron loss.

PRIOR ART DOCUMENTS

Patent Documents

Patent Document 1: Japanese Patent No. 2500033
Patent Document 2: Japanese Patent No. 3378934
Patent Document 3: Japanese Patent No. 4126479

SUMMARY OF THE INVENTION

As mentioned above, the iron scraps are reused as a material for the foundry pig, so that when Al content is decreased, it is actually difficult to produce a non-oriented electrical steel sheet having a high magnetic density and a low iron loss at a low cost in a good productivity without requiring a new equipment or process control.

Aspects of the invention are made in view of the above problems inherent to the conventional techniques and is to provide a non-oriented electrical steel sheet having a low Al content and an excellent recyclability as well as a high magnetic flux density and a low iron loss, and a method for producing the steel sheet at a low cost in a good productivity.

The inventors have focused attention on a relation between chemical compositions of oxide-based inclusions existing in a steel sheet and magnetic properties for solving the above problems and made various studies. As a result, it has been found out that in order to increase the magnetic flux density and reduce the iron loss of the non-oriented electrical steel sheet, it is effective to improve grain growth in the hot band annealing and finish annealing by decreasing sol. Al content as far as possible and controlling a compositional ratio of CaO and/or $Al_2O_3$ in oxide-based inclusions existing in a steel material to a proper range, and hence the invention has been accomplished.

That is, aspects of the invention are directed to a non-oriented electrical steel sheet having a chemical composition comprising C: not more than 0.0050 mass %, Si: 1.5-5.0 mass %, Mn: 0.20-3.0 mass %, sol. Al: not more than 0.0050 mass %, P: not more than 0.2 mass %, S: not more than 0.0050 mass %, N: not more than 0.0040 mass %, and the remainder being Fe and inevitable impurities, wherein a compositional ratio of CaO in oxide-based inclusions existing in a steel sheet defined by the following equation (1):

$$CaO/(SiO_2+Al_2O_3+CaO) \qquad (1)$$

is not less than 0.4 and/or a compositional ratio of $Al_2O_3$ defined by the following equation (2):

$$Al_2O_3/(SiO_2+Al_2O_3+CaO) \quad (2)$$

is not less than 0.3.

The non-oriented electrical steel sheet according to aspects of the invention is characterized by including at least one element group of the following groups A-D in addition to the above chemical composition:

Group A: Ca: 0.0005-0.0100 mass %,

Group B: one or two selected from Sn: 0.01-0.1 mass % and Sb: 0.01-0.1 mass %,

Group C: one or two selected from Mg: 0.001-0.05 mass % and REM: 0.001-0.05 mass %, and Group D: one or more selected from Cu: 0.01-0.5 mass %, Ni: 0.01-0.5 mass % and Cr: 0.01-0.5 mass %.

Also, aspects of the invention are directed to a method for producing a non-oriented electrical steel sheet by hot rolling a slab having any one of the aforementioned chemical compositions to form a hot rolled sheet, cold rolling the sheet without a hot band annealing and then performing a finish annealing, characterized in that a compositional ratio of CaO in oxide-based inclusions existing in the slab defined by the following equation (1):

$$CaO/(SiO_2+Al_2O_3+CaO) \quad (1)$$

is not less than 0.4 and/or a compositional ratio of $Al_2O_3$ defined by the following equation (2):

$$Al_2O_3/(SiO_2+Al_2O_3+CaO) \quad (2)$$

is not less than 0.3, and a coiling temperature in the hot rolling is not lower than 650° C.

Further, aspects of the invention are directed to a method for producing a non-oriented electrical steel sheet by hot rolling a slab having any one of the aforementioned chemical compositions to form a hot rolled sheet and subjecting the sheet to a hot band annealing, a cold rolling and a finish annealing, characterized in that a compositional ratio of CaO in oxide-based inclusions existing in the slab defined by the following equation (1):

$$CaO/(SiO_2+Al_2O_3+CaO) \quad (1)$$

is not less than 0.4 and/or a compositional ratio of $Al_2O_3$ defined by the following equation (2):

$$Al_2O_3/(SiO_2+Al_2O_3+CaO) \quad (2)$$

is not less than 0.3, and the hot band annealing is conducted at a temperature of 900-1150° C.

According to aspects of the invention, a non-oriented electrical steel sheet having a high magnetic flux density, a low iron and an excellent recyclability can be provided at a low cost in a good productivity without requiring a new equipment or process control.

EMBODIMENTS FOR CARRYING OUT THE INVENTION

In order to examine a method for improving a texture to improve magnetic properties, the inventors have first produced a steel slab of a chemical composition based on the chemical composition of the steel disclosed in the Patent Document 3 and prepared by decreasing Al content as much as possible and adding P and Sn, concretely a steel slab having a chemical composition comprising C: 0.0030 mass %, Si: 1.6 mass %, Mn: 0.08 mass %, P: 0.06 mass %, S: 0.0020 mass %, sol. Al: 0.0006 mass %, N: 0.0015 mass % and Sn: 0.04 mass %. When the slab is reheated to 1100° C. and then hot rolled to a thickness of 2.3 mm, brittleness cracking, breakage and the like are caused in a part of the steel sheets, so that the hot rolling is obliged to be stopped.

In order to elucidate the cause of the cracking, breakage and the like, the steel sheet is examined on the way of the hot rolling and as a result, it has been found that S is concentrated in the cracked and broken portion. Since elements other than S and Fe are not observed in the S-concentrated portion, the cause of the brittleness is guessed due to the fact that S in steel forms a low melting point FeS during the hot rolling and causes the hot brittleness.

In order to prevent the brittleness due to FeS, it is effective to decrease S, but an increase of desulfurization cost cannot be avoided. Therefore, the inventors have considered that when S is fixed as MnS or CaS having a high melting point by increasing Mn and adding Ca, the formation of FeS having a low melting point can be prevented to suppress the brittleness in the hot rolling. When a steel slab having a chemical composition prepared by increasing Mn content and adding Ca in the above steel (C: 0.0030 mass %, Si: 1.6 mass %, Mn: 0.40 mass %, P: 0.07 mass %, S: 0.0020 mass %, sol. Al: 0.0008 mass %, N: 0.0015 mass %, Sn: 0.04 mass % and Ca: 0.0030 mass %) is produced and reheated to a temperature of 1100° C. and then hot rolled to a thickness of 2.3 mm, the occurrence of cracking and breakage is not found.

From the above, it is confirmed that the increase of Mn and the addition of Ca is effective for preventing the cracking and breakage in the hot rolling of a low-Al steel.

Then, the inventors have observed a section parallel to the rolling direction (L-section) in a product sheet (finish-annealed sheet) produced by using the steel slab of the above Mn-increased and Ca-added chemical composition as a raw material by means of a scanning type electron microscope (SEM), analyzed a chemical composition of oxide-based inclusions existing in the steel sheet and investigated a relation between the analyzed results and magnetic properties of the product sheet. As a result, it has been found that the magnetic properties tend to be varied by the chemical composition of the oxide-based inclusions existing in the steel sheet, particularly the compositional ratio of CaO and compositional ratio of $Al_2O_3$.

In order to change the chemical composition of the oxide-based inclusions in the steel of the above chemical composition, the inventors have melted various steels having a chemical composition prepared by variously changing addition amounts of Al and Ca used as a deoxidizing agent, concretely a chemical composition comprising C: 0.0015-0.0035 mass %, Si: 1.6-1.7 mass %, Mn: 0.40 mass %, P: 0.07 mass %, S: 0.0010-0.0030 mass %, sol. Al: 0.0001-0.0030 mass %, N: 0.0010-0.0020 mass %, Sn: 0.03 mass % and Ca: 0-0.0040 mass %, and continuously cast into steel slabs. Moreover, the reason why each of C, Si, S and N has the compositional range is due to variation in the melting, which is not intended.

Next, the slab is reheated to a temperature of 1100° C. and hot rolled to obtain a hot rolled sheet of 2.3 mm in thickness, which is pickled and cold rolled to obtain a cold rolled sheet having a final thickness of 0.50 mm and thereafter subjected to a finish annealing at a temperature of 1000° C.

From the thus obtained steel sheet after the finish annealing are cut out Epstein test specimens in a rolling direction (L) and a direction perpendicular to the rolling direction (C), and an iron loss $W_{15/50}$ (iron loss excited at a magnetic flux density of 1.5 T and a frequency of 50 Hz) thereof is measured according to JIS C2552.

Also, a section of the finish annealed steel sheet in the rolling direction (L section) is observed with a scanning type electron microscope (SEM) to analyze a chemical composition of oxide-based inclusions, from which are determined a compositional ratio (mass % ratio) of CaO defined by the following equation (1):

$$CaO/(SiO_2+Al_2O_3+CaO) \qquad (1)$$

and a compositional ratio (mass % ratio) of $Al_2O_3$ defined by the following equation (2):

$$Al_2O_3/(SiO_2+Al_2O_3+CaO) \qquad (2).$$

Moreover, each compositional ratio (mass % ratio) of CaO and $Al_2O_3$ is an average value on 200 or more oxide-based inclusions. Although MnO, MgO and so on are found in the oxide-based inclusions in addition to $SiO_2$, $Al_2O_3$ and CaO, the amounts thereof are little, so that they are not considered in the calculation of the compositional ratio.

Figure 1:
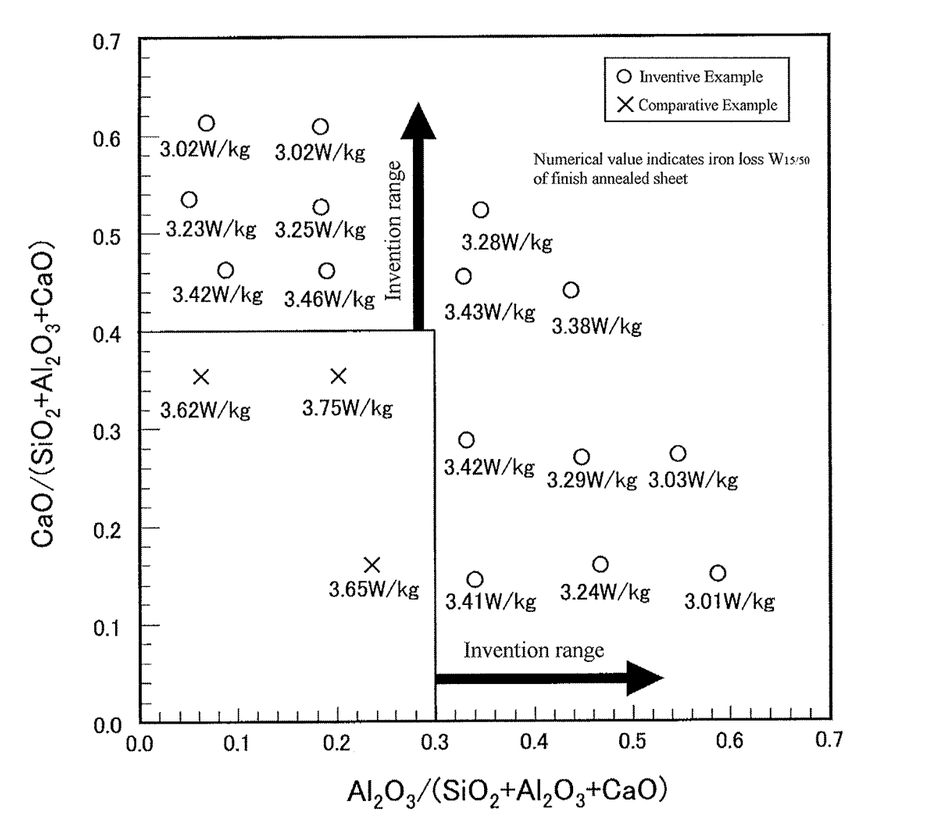
FIG. 1 is a graph showing an influence of a compositional ratio of an oxide-based inclusion existing in a steel sheet upon an iron loss $W_{15/50}$.

In FIG. 1 is shown a relation among a compositional ratio of CaO and a compositional ratio of $Al_2O_3$ in the oxide-based inclusions and an iron loss $W_{15/50}$. As seen from this FIGURE, the iron loss $W_{15/50}$ is poor when the compositional ratio of $CaO(CaO/(SiO_2+Al_2O_3+CaO))$ is less than 0.4 and the compositional ratio of $Al_2O_3$ ($Al_2O_3/(SiO_2+Al_2O_3+CaO)$) is less than 0.3, whereas the iron loss $W_{15/50}$ is good when $CaO/(SiO_2+Al_2O_3+CaO)$ is not less than 0.4 and/or $Al_2O_3/(SiO_2+Al_2O_3+CaO)$ is not less than 0.3.

With respect to the finish annealed sheets of poor iron loss $W_{15/50}$, when the oxide-based inclusions found in a section of the rolling direction (L-section) are observed with an optical microscope, it has been confirmed that they have a form extending in the rolling direction. The inventors have the following thought on the above results.

The oxide-based inclusions having a compositional ratio of $CaO(CaO/(SiO_2+Al_2O_3+CaO))$ of less than 0.4 and a compositional ratio of $Al_2O_3$ ($Al_2O_3/(SiO_2+Al_2O_3+CaO)$) of less than 0.3 have a tendency of extending in the rolling direction during the hot rolling because the melting point is low. The inclusions extended in the rolling direction inhibit the grain growth in self-annealing immediately after the hot rolling, hot band annealing and finish annealing to make the crystal grain size small and inhibit the movement of magnetic domain walls, and the iron loss properties are deteriorated. Therefore, in order to improve the magnetic properties of the steel sheet after the finish annealing (product sheet), it is considered that it is effective to improve the grain growth by controlling the chemical composition of the oxide-based inclusions existing in the steel to a proper range to prevent the extension in the rolling direction during the hot band annealing.

Aspects of the invention are developed based on the above knowledge.

The chemical composition of the non-oriented electrical steel sheet (product sheet) according to aspects of the invention will be described below.

C: not more than 0.0050 mass %

C is an element causing magnetic aging to increase the iron loss. Particularly, when it exceeds 0.0050 mass %, the increase of the iron loss becomes remarkable, so that the content is limited to not more than 0.0050 mass %. Preferably, it is not more than 0.0030 mass %. Moreover, the lower limit is not particularly restricted because the content is preferable to become smaller.

Si: 1.5-5.0 mass %

Si is an element effective for increasing an electric resistance of steel to reduce the iron loss. Particularly, Al having the same effect as Si is reduced in accordance with aspects of the invention, so that Si is added in an amount of not less than 1.5 mass %. However, when Si exceeds 5.0 mass %, not only the magnetic flux density is decreased, but also steel is embrittled to cause cracking during the cold rolling, whereby the productivity is largely deteriorated. Therefore, the upper limit is 5.0 mass %. Preferably, it is a range of 1.6-3.5 mass %.

Mn: 0.20-3.0 mass %

Mn forms MnS through bonding to S and has an effect of preventing hot brittleness by FeS. Also, it is an element effective of increasing an electric resistance of steel to reduce the iron loss like Si. In accordance with aspects of the invention, therefore, Mn is contained in an amount of not less than 0.20 mass %. While, when it exceeds 3.0 mass %, the magnetic flux density is decreased, so that the upper limit is set to 3.0 mass %. Preferably, it is a range of 0.25-1.0 mass %.

P: not more than 0.2 mass %

P is an effective element having a large effect of increasing the hardness of steel with a very small addition amount and is properly added in accordance with the required hardness. However, the excessive addition of P brings about the decrease of cold rolling property, so that the upper limit is set to 0.2 mass %. Preferably, it is a range of 0.040-0.15 mass %.

S: not more than 0.0050 mass %

S forms precipitates or inclusions as a sulfide, which deteriorates the productivity (hot rolling property) or the magnetic properties of the product sheet, so that the content is preferable to become smaller. In accordance with aspects of the invention, Mn and Ca suppress the bad influence of S, so that the upper limit is accepted up to 0.0050 mass %, while when the magnetic properties are considered important, it is preferable to be not more than 0.0025 mass %. Moreover, the lower limit is not particularly restricted because the S content is preferable to become smaller.

sol. Al: not more than 0.0050 mass %

Al is an element effective for increasing an electric resistance of steel to reduce the iron loss like Si. However, from a viewpoint of recycling scrap as a starting material for foundry pig as previously mentioned, Al is desired to be less than 0.05% and a smaller amount is more preferable.

In accordance with aspects of the invention, Al is further decreased for improving the texture and increasing the magnetic flux density and limited to not more than 0.0050 mass % as sol. Al (acid-soluble Al). Preferably, it is not more than 0.0020 mass %.

N: not more than 0.0040 mass %

N is an element deteriorating the magnetic properties like C as previously described. In particular, the adverse effect becomes remarkable in a low Al material, so that it is limited to not more than 0.0040 mass %. Preferably, it is not more than 0.0030 mass %. Moreover, the lower limit is not particularly restricted because the content is preferable to become smaller.

The non-oriented electrical steel sheet according to aspects of the invention can include at least one element group of the following groups A-D within the following range in addition to the above essential elements.

Group A: Ca: 0.0005-0.0100 mass %,

Ca has an effect of fixing S in steel to prevent the formation of low-melting FeS to thereby improve the hot rolling property like Mn. In accordance with aspects of the invention, the addition of Ca is not essential because Mn content is increased. However, Ca has an effect of suppressing the generation of scabs in the hot rolling, so that it is preferable to be added in an amount of not less than 0.0005 mass %. However, when the addition amount exceeds 0.0100 mass %, an amount of a sulfide and an oxide of Ca are increased to inhibit the grain growth and adversely deteriorate the iron loss property, so that the upper limit is preferable to be 0.0100 mass %. More preferably, it is a range of 0.0010-0.0050 mass %.

Group B: one or two selected from Sn: 0.01-0.1 mass % and Sb: 0.01-0.1 mass %

Each of Sn and Sb has an effect of improving the texture to enhance the magnetic properties. In order to obtain such an effect, each element is preferable to be added in an amount of not less than 0.01 mass % alone or in combination. However, when they are added excessively, steel is embrittled to cause surface defects such as sheet breakage, scab and the like in the production process of the steel sheet, so that each upper limit is preferable to be 0.1 mass %. More preferably, it is a range of 0.02-0.05 mass %.

Group C: one or two selected from Mg: 0.001-0.05 mass % and REM: 0.001-0.05 mass %

Mg and REM are elements having an effect of improving the grain growth to enhance the magnetic properties since they are coarsened by forming a sulfide more stable than MnS and $Cu_2S$ at a high temperature to decrease fine sulfides. In order to obtain such an effect, it is preferable to contain one or more of Mg and REM in an amount of not less than 0.001 mass % for each. While, when Mg and REM are added in an amount exceeding 0.05 mass %, the effect is saturated and it becomes economically disadvantageous, so that the upper limit of each element is preferable to be 0.05 mass %.

Group D: one or more selected from Cu: 0.01-0.5 mass %, Ni: 0.01-0.5 mass % and Cr: 0.01-0.5 mass %

Cu, Ni and Cr are elements effective of increasing the specific resistance of the steel sheet to reduce the iron loss. In order to obtain such an effect, it is preferable to add each element in an amount of not less than 0.01 mass %. While, these elements are expensive as compared to Si and Al, so that each addition amount is preferable to be not more than 0.5 mass %.

In the non-oriented electrical steel sheet according to aspects of the invention, the remainder other than the above ingredients is Fe and inevitable impurities. However, other elements can be included within the scope not damaging the effect of aspects of the invention. For example, V: not more than 0.004 mass %, Nb: not more than 0.004 mass %, B: not more than 0.0005 mass % and Ti: not more than 0.002 mass % are acceptable as an amount contained in the inevitable impurities.

The inclusions existing in the non-oriented electrical steel sheet according to aspects of the invention will be described below.

In order that the non-oriented electrical steel sheet according to aspects of the invention has excellent magnetic properties, it is necessary that a compositional ratio ($CaO/(SiO_2+Al_2O_3+CaO)$) of CaO is not less than 0.4 and/or a compositional ratio ($Al_2O_3/(SiO_2+Al_2O_3+CaO)$) of $Al_2O_3$ is not less than 0.3 in the oxide-based inclusions existing in the product sheet (finish annealed steel sheet) and hence the hot rolled steel sheet or slab as a raw material therefor. When the compositional ratio is outside the above range, the oxide-based inclusion is extended by hot rolling, which inhibits the grain growth in the self-annealing immediately after the hot rolling, the hot band annealing and the finish annealing to deteriorate the magnetic properties. Preferably, the compositional ratio of CaO is not less than 0.5 and/or the compositional ratio of $Al_2O_3$ is not less than 0.4. More preferably, the compositional ratio of CaO is not less than 0.6 or the compositional ratio of $Al_2O_3$ is not less than 0.5. Here, each of the compositional ratio of CaO and the compositional ratio of $Al_2O_3$ in the oxide-based inclusions existing in the steel sheet is an average value calculated from values obtained when 200 or more oxide-based inclusions existing in a section parallel to the rolling direction (L section) of the steel sheet are observed with SEM (scanning type electron microscope) to analyze chemical compositions thereof.

Next, there will be explained a method of controlling the chemical composition of the inclusion existing in the non-oriented electrical steel sheet according to aspects of the invention to the above range.

In order to control the chemical composition of the inclusion to the above range, it is necessary to rationalize an addition amount of Si and/or Al as a deoxidizing agent in a secondary refining step, an addition amount of Ca, a deoxidizing time and so on to thereby control the oxide-based inclusions in the slab to the above proper range.

Concretely, it is effective to increase an addition amount of Al as a deoxidizing agent for enhancing the compositional ratio of $Al_2O_3$. However, as the addition amount of Al is increased, sol. Al is also increased, so that it is necessary to increase the addition amount of Al within such a range that sol. Al is not more than 0.0050 mass %. On the other hand, in order to enhance the compositional ratio of CaO, it is effective to add Ca source such as CaSi or the like as well as to reduce the addition amount of Si as a deoxidizing agent to decrease $SiO_2$.

The compositional ratio of the oxide-based inclusions exiting in steel can be controlled to the above range by the above method. Moreover, Al is a nitride forming element and Ca is a sulfide forming element, so that it is important that the addition amounts of Al as a deoxidizing agent and the Ca source are properly adjusted in accordance with the N and S contents.

There will be described the production method of the non-oriented electrical steel sheet according to aspects of the invention below.

When the non-oriented electrical steel sheet according to aspects of the invention is produced by omitting hot band annealing, it is necessary to control a coiling temperature after the hot rolling. While, when the production is performed by subjecting to hot band annealing, the steel sheet can be produced in the production facilities and production process applied to the ordinary non-oriented electrical steel sheets.

In the production method of the non-oriented electrical steel sheet according to aspects of the invention, steel melted in a converter, an electric furnace or the like is first adjusted to a given chemical composition by secondary refining with a degassing equipment or the like and then shaped into a raw steel material (slab) by a continuous casting method or an ingot making-blooming method.

In the production method according to aspects of the invention, it is important to control the composition of the oxide-based inclusions existing in steel to a proper range as previously mentioned. That is, it is necessary to control a compositional ratio ($CaO/(SiO_2+Al_2O_3+CaO)$) of CaO to not less than 0.4 and/or a compositional ratio ($Al_2O_3/(SiO_2+Al_2O_3+CaO)$) of $Al_2O_3$ to not less than 0.3. This method is mentioned above.

Thereafter, the thus produced slab is subjected to hot rolling, in which a slab reheating temperature (SRT) is preferable to be a range of 1000-1200° C. When SRT exceeds 1200° C., not only the energy loss is uneconomically increased, but also the high-temperature strength of the slab is decreased to easily cause production troubles such as slab sagging and the like. While when it is lower than 1000° C., hot deformation resistance is increased, and it is difficult to perform the hot rolling.

The subsequent hot rolling may be conducted under ordinary conditions. The thickness of the steel sheet after the hot rolling is preferable to be a range of 1.5-2.8 mm in view of ensuring the productivity. When it is less than 1.5 mm, rolling troubles in the hot rolling are increased, while when it exceeds 2.8 mm, the cold rolling reduction rate becomes excessively high and the texture is deteriorated. More preferably, the thickness of the hot rolled sheet is a range of 1.7-2.4 mm.

The hot band annealing after the hot rolling may be conducted or omitted. From a viewpoint of reducing the production cost, it is advantageous to omit the hot band annealing.

Here, when the hot band annealing is omitted, it is necessary to control a coiling temperature after the hot rolling to not lower than 650° C. This is due to the fact that when the self-annealing of the hot rolled sheet coil is insufficient and the steel sheet before the cold rolling is not fully recrystallized, ridging is caused or the magnetic flux density is decreased. Preferably, it is not lower than 670° C.

On the other hand, when the hot band annealing is conducted, a soaking temperature in the hot band annealing is preferable to be a range of 900-1150° C. When the soaking temperature is lower than 900° C., the rolled structure is retained, so that the effect of improving the magnetic properties cannot be obtained sufficiently. While when it exceeds 1150° C., the crystal grains are coarsened, and hence cracking is easily caused in the cold rolling, and it becomes uneconomically disadvantageous.

It is needless to say that the coiling temperature can be not lower than 650° C. even when the hot band annealing is conducted.

Next, the steel sheet after the hot rolling or the hot band annealing is subjected to a single cold rolling or two or more cold rollings including an intermediate annealing therebetween to form a cold rolled steel sheet having a final thickness. In this case, it is preferable to adopt a rolling performed by raising a sheet temperature to about 200° C., or a so-called warm rolling in order to increase the magnetic flux density. Moreover, the thickness of the cold rolled sheet (final thickness) is not particularly limited, but is preferable to be a range of 0.10-0.60 mm. When it is less than 0.10 mm, productivity is decreased, while when it exceeds 0.60 mm, an effect of reducing the iron loss is small. In order to increase the effect of reducing the iron loss, it is more preferable to be a range of 0.10-0.35 mm.

The steel sheet after the cold rolling (cold rolled sheet) is thereafter subjected to a finish annealing by continuous annealing. In the finish annealing, a soaking temperature is preferable to be a range of 700-1150° C. When the soaking temperature is lower than 700° C., recrystallization is not promoted sufficiently, and good magnetic properties are not obtained, and further the effect of correcting the sheet form by the continuous annealing cannot be obtained. While, when it exceeds 1150° C., energy loss is increased, and it becomes uneconomical.

In the steel sheet after the finish annealing, it is preferable that an insulating film is applied to the steel sheet surface and baked for more reducing the iron loss. Moreover, it is preferable that the insulating film is a resin-containing organic coating when it is intended to ensure a good punchability. While, when a weldability is considered to be important, it is preferably a semi-organic or an inorganic coating.

Example 1

Steels A-Q having different chemical compositions shown in Table 1 are melted and shaped into steel slabs by a continuous casting method. In the melting of the steel, Si and Al are mainly used as a deoxidizing agent, and CaSi is added as a Ca source. The addition amount of the deoxidizing agent or CaSi is adjusted in accordance with the N, O or S content in steel.

Next, the slab is reheated to a temperature of 1050-1130° C. and hot rolled to obtain a hot rolled sheet of 2.3 mm in thickness. In this case, a coiling temperature is 680° C. in all steels.

Thereafter, the hot rolled sheet is pickled and cold rolled to form a cold rolled sheet having a final sheet thickness of 0.50 mm, which is subjected to a finish annealing at a soaking temperature of 1000° C. and coated with an insulating film to obtain a non-oriented electrical steel sheet (product sheet). In the steel J shown in Table 1, cracking is caused during the hot rolling, and in the steels E and Q, cracking is caused during cold rolling, so that subsequent steps are stopped.

TABLE 1

| Steel symbol | Chemical composition (mass %) | | | | | | | | | | Inclusions (*) | | Magnetic properties | | Remarks |
|---|---|---|---|---|---|---|---|---|---|---|---|---|---|---|---|
| | C | Si | Mn | sol. Al | P | S | N | Sn | Sb | Ca | Equation (1) | Equation (2) | $W_{15/50}$ (W/kg) | $B_{50}$ (T) | |
| A | 0.0015 | 1.62 | 0.420 | 0.0009 | 0.07 | 0.0018 | 0.0011 | 0.041 | — | 0.0036 | 0.61 | 0.15 | 2.98 | 1.731 | Inventive Example |
| B | 0.0021 | 1.68 | 0.413 | 0.0018 | 0.08 | 0.0017 | 0.0014 | 0.038 | — | — | 0.28 | 0.52 | 3.04 | 1.729 | Inventive Example |
| C | 0.0015 | 1.61 | 0.384 | 0.0002 | 0.08 | 0.0011 | 0.0012 | 0.042 | — | 0.0002 | 0.31 | 0.28 | 3.71 | 1.720 | Comparative Example |
| D | 0.0025 | 1.66 | 0.395 | 0.0002 | 0.07 | 0.0011 | 0.0013 | — | 0.041 | 0.0029 | 0.55 | 0.13 | 3.21 | 1.725 | Inventive Example |
| E | 0.0016 | 5.21 | 0.432 | 0.0008 | 0.07 | 0.0018 | 0.0022 | 0.039 | — | 0.0035 | Cracking is caused during cold rolling | | | | Comparative Example |
| F | 0.0028 | 2.02 | 0.811 | 0.0002 | 0.07 | 0.0024 | 0.0017 | 0.029 | — | 0.0039 | 0.63 | 0.12 | 2.43 | 1.722 | Inventive Example |
| G | 0.0017 | 1.67 | 0.389 | 0.0018 | 0.08 | 0.0010 | 0.0025 | 0.041 | — | — | 0.18 | 0.45 | 3.28 | 1.725 | Inventive Example |
| H | 0.0024 | 1.12 | 0.418 | 0.0008 | 0.08 | 0.0015 | 0.0018 | 0.049 | — | 0.0028 | 0.59 | 0.33 | 4.01 | 1.735 | Comparative Example |
| I | 0.0029 | 1.69 | 0.428 | 0.0003 | 0.11 | 0.0023 | 0.0013 | 0.031 | 0.016 | 0.0037 | 0.52 | 0.12 | 3.02 | 1.730 | Inventive Example |

TABLE 1-continued

| Steel sym-bol | Chemical composition (mass %) | | | | | | | | | | Inclusions (*) | | Magnetic properties | | Remarks |
|---|---|---|---|---|---|---|---|---|---|---|---|---|---|---|---|
| | C | Si | Mn | sol. Al | P | S | N | Sn | Sb | Ca | Equa-tion (1) | Equa-tion(2) | $W_{15/50}$ (W/kg) | $B_{50}$ (T) | |
| J | 0.0019 | 1.67 | 0.125 | 0.0019 | 0.08 | 0.0017 | 0.0019 | 0.041 | 0.024 | — | Cracking is caused during hot rolling | | | | Comparative Example |
| K | 0.0022 | 1.69 | 0.901 | 0.0001 | 0.07 | 0.0023 | 0.0018 | 0.052 | — | 0.0033 | 0.52 | 0.12 | 2.99 | 1.727 | Inventive Example |
| L | 0.0023 | 1.62 | 0.395 | 0.0063 | 0.09 | 0.0021 | 0.0025 | 0.043 | — | 0.0032 | 0.47 | 0.61 | 4.05 | 1.702 | Comparative Example |
| M | 0.0017 | 1.63 | 0.472 | 0.0005 | 0.10 | 0.0065 | 0.0019 | — | 0.042 | 0.0039 | 0.62 | 0.22 | 4.03 | 1.706 | Comparative Example |
| N | 0.0027 | 1.68 | 0.451 | 0.0004 | 0.07 | 0.0017 | 0.0021 | 0.041 | — | 0.0035 | 0.56 | 0.24 | 3.12 | 1.730 | Inventive Example |
| O | 0.0021 | 1.67 | 0.424 | 0.0012 | 0.05 | 0.0019 | 0.0019 | 0.038 | — | 0.0030 | 0.52 | 0.31 | 3.14 | 1.725 | Inventive Example |
| P | 0.0028 | 1.66 | 0.411 | 0.0001 | 0.16 | 0.0018 | 0.0018 | 0.039 | — | 0.0033 | 0.54 | 0.12 | 3.11 | 1.732 | Inventive Example |
| Q | 0.0019 | 1.68 | 0.378 | 0.0033 | 0.22 | 0.0017 | 0.0016 | 0.038 | — | 0.0035 | Cracking is caused during cold rolling | | | | Comparative Example |

(*) Equation (1): $CaO/(SiO_2 + Al_2O_3 + CaO)$, Equation (2): $Al_2O_3/(SiO_2 + Al_2O_3 + CaO)$ Then, sections of the thus obtained product sheets parallel to the rolling direction (L section) are observed by a scanning type electron microscope (SEM) to analyze a chemical composition in 200 or more oxide-based inclusions and determine an average value thereof, from which a compositional ratio of CaO and a compositional ratio of $Al_2O_3$ are calculated.

Also, Epstein test specimens are cut out from the product sheets in the rolling direction (L) and the direction perpendicular to the rolling direction (C), and the magnetic flux density $B_{50}$ (magnetic flux density at a magnetization force of 5000 A/m) and iron loss $W_{15/50}$ (iron loss in the excitation at a magnetic flux density of 1.5 T and a frequency of 50 Hz) are measured according to JIS C2552.

The above measured results are also shown in Table 1. As seen from these results, the steel sheets adapted to the invention can be produced without causing troubles in the hot rolling and cold rolling and have such excellent magnetic properties that the iron loss $W_{15/50}$ is low as not more than 3.28 W/kg and the magnetic flux density $B_{50}$ is high as not less than 1.722 T. Conversely, it can be seen that the magnetic properties in the steel sheets not adapted to the invention, i.e. the iron loss $W_{15/50}$ and/or the magnetic flux density $B_{50}$ are/is inferior. Moreover, since the addition amount of Al as the deoxidizing agent is small in the melting of steel and also CaSi is not added, steel C is an example having a compositional ratio of inclusions out of the range according to aspects of the invention Example 2

Steels R-V having different chemical compositions shown in Table 2 are melted and shaped into slabs by a continuous casting method in the same manner as Example 1. The slab is then reheated to a temperature of 1050-1110° C. and hot rolled to form a hot rolled sheet of 2.3 mm in thickness, which is pickled and cold rolled to obtain a cold rolled sheet having a final thickness of 0.50 mm. Thereafter, the sheet is subjected to a finish annealing at a soaking temperature of 1000° C. and coated with an insulating film to obtain a non-oriented electrical steel sheet (product sheet). In this case, a coiling temperature after the hot rolling is varied in four levels within a range of 600-720° C. as shown in Table 2. Steel V is formed into a hot rolled sheet, which is then subjected to a hot band annealing at a soaking temperature of 1000° C. by continuous annealing and pickled.

With respect to the thus obtained product sheets, a compositional ratio of CaO and a compositional ratio of $Al_2O_3$ are calculated and the magnetic flux density $B_{50}$ and iron loss $W_{15/50}$ are measured like Example 1.

TABLE 2

| Steel sym-bol | Chemical composition (mass %) | | | | | | | | | | Inclusion (*) | | Coiling temperature in hot rolling (° C.) | Magnetic properties | | Remarks |
|---|---|---|---|---|---|---|---|---|---|---|---|---|---|---|---|---|
| | C | Si | Mn | sol. Al | P | S | N | Sn | Sb | Ca | Equa-tion (1) | Equa-tion(2) | | $W_{15/50}$ (W/kg) | $B_{50}$ (T) | |
| R | 0.0022 | 1.67 | 0.397 | 0.0006 | 0.07 | 0.0021 | 0.0018 | 0.045 | — | 0.0038 | 0.60 | 0.12 | 600 | 3.12 | 1.720 | Comparative Example |
| S | 0.0019 | 1.66 | 0.397 | 0.0007 | 0.07 | 0.0019 | 0.0016 | 0.044 | — | 0.0039 | 0.61 | 0.13 | 655 | 3.05 | 1.726 | Inventive Example |
| T | 0.0023 | 1.62 | 0.399 | 0.0002 | 0.07 | 0.0023 | 0.0017 | 0.048 | — | 0.0038 | 0.63 | 0.13 | 675 | 3.04 | 1.730 | Inventive Example |
| U | 0.0021 | 1.65 | 0.395 | 0.0006 | 0.07 | 0.0022 | 0.0018 | 0.045 | — | 0.0040 | 0.62 | 0.15 | 720 | 3.03 | 1.735 | Inventive Example |
| V | 0.0022 | 1.67 | 0.397 | 0.0007 | 0.07 | 0.0022 | 0.0019 | 0.045 | — | 0.0038 | 0.61 | 0.13 | 600 | 3.01 | 1.739 | Inventive Example |

(*) Equation (1): $CaO/(SiO_2 + Al_2O_3 + CaO)$, Equation (2): $Al_2O_3/(SiO_2 + Al_2O_3 + CaO)$ The above measured results are also shown in Table 2. As seen from these results, the steel sheets adapted to the invention have excellent magnetic properties that the iron loss $W_{15/50}$ is not more than 3.05 W/kg and the magnetic flux density $B_{50}$ is not less than 1.726 T.

Example 3

Steels W-AG having different chemical compositions shown in Table 3 are melted and shaped into slabs by a continuous casting method in the same manner as Example 1. Then, the slab is reheated to a temperature of 1090-1220° C. and hot rolled to form a hot rolled sheet of 2.1 mm in thickness, which is pickled and cold rolled to form a cold rolled sheet having a final thickness of 0.50 mm. Thereafter, the sheet is subjected to a finish annealing at a soaking temperature of 1010° C. and coated with an insulating film to obtain a non-oriented electrical steel sheet (product sheet). In this case, a coiling temperatures after the hot rolling are 670° C. in all steels.

With respect to the thus obtained product sheets, a compositional ratio of CaO and a compositional ratio of $Al_2O_3$ are calculated and the magnetic flux density $B_{50}$ and iron loss $W_{15/50}$ are measured like Example 1.

TABLE 3

| Steel sym-bol | Chemical composition (mass %) | | | | | | | | | Inclusion* | | Magnetic properties | | Remarks |
| --- | --- | --- | --- | --- | --- | --- | --- | --- | --- | --- | --- | --- | --- | --- |
| | C | Si | Mn | sol. Al | P | S | N | Ca | Other ingredient | Equation (1) | Equation (2) | $W_{15/50}$ (W/kg) | $B_{50}$ (T) | |
| W | 0.0018 | 1.65 | 0.418 | 0.0008 | 0.08 | 0.0016 | 0.0015 | 0.0035 | REM: 0.002 | 0.60 | 0.25 | 2.94 | 1.732 | Inventive Example |
| X | 0.0019 | 1.67 | 0.502 | 0.0020 | 0.05 | 0.0015 | 0.0018 | — | REM: 0.005 | 0.16 | 0.54 | 2.99 | 1.726 | Inventive Example |
| Y | 0.0016 | 1.63 | 0.377 | 0.0002 | 0.09 | 0.0014 | 0.0013 | 0.0038 | Mg: 0.001 | 0.61 | 0.14 | 3.02 | 1.729 | Inventive Example |
| Z | 0.0014 | 1.64 | 0.387 | 0.0019 | 0.06 | 0.0012 | 0.0015 | — | Mg: 0.003 | 0.17 | 0.52 | 3.13 | 1.727 | Inventive Example |
| AA | 0.0014 | 1.68 | 0.363 | 0.0005 | 0.09 | 0.0021 | 0.0016 | 0.0041 | Ni: 0.05 | 0.64 | 0.21 | 2.94 | 1.730 | Inventive Example |
| AB | 0.0012 | 1.71 | 0.295 | 0.0006 | 0.09 | 0.0012 | 0.0019 | 0.0035 | Ni: 0.14 | 0.54 | 0.20 | 2.86 | 1.733 | Inventive Example |
| AC | 0.0017 | 1.66 | 0.385 | 0.0002 | 0.08 | 0.0021 | 0.0012 | 0.0038 | Cu: 0.09 | 0.59 | 0.11 | 2.98 | 1.729 | Inventive Example |
| AD | 0.0019 | 1.68 | 0.372 | 0.0007 | 0.08 | 0.0019 | 0.0014 | 0.0037 | Cu: 0.15 | 0.54 | 0.15 | 2.89 | 1.731 | Inventive Example |
| AE | 0.0021 | 1.66 | 0.503 | 0.0007 | 0.05 | 0.0016 | 0.0012 | 0.0039 | Cr: 0.08 | 0.61 | 0.26 | 3.03 | 1.730 | Inventive Example |
| AF | 0.0022 | 1.62 | 0.588 | 0.0001 | 0.01 | 0.0014 | 0.0014 | 0.0031 | Cr: 0.12 | 0.52 | 0.11 | 2.94 | 1.732 | Inventive Example |
| AG | 0.0015 | 1.65 | 0.401 | 0.0018 | 0.06 | 0.0009 | 0.0011 | — | — | 0.29 | 0.48 | 3.03 | 1.725 | Inventive Example |

*Equation (1): $CaO/(SiO_2 + Al_2O_3 + CaO)$, Equation (2): $Al_2O_3/(SiO_2 + Al_2O_3 + CaO)$ The above measured results are also shown in Table 3. As seen from these results, the steel sheets adapted to the invention have excellent magnetic properties that the iron loss $W_{15/50}$ is not more than 3.13 W/kg and the magnetic flux density $B_{50}$ is not less than 1.725 T.

The invention claimed is:

1. A non-oriented electrical steel sheet having a chemical composition comprising C: not more than 0.0050 mass %, Si: 1.5-5.0 mass %, Mn: 0.20-3.0 mass %, sol. Al: not more than 0.0050 mass %, P: not more than 0.2 mass %, 5: not more than 0.0050 mass %, N: not more than 0.0040 mass %, and the remainder being Fe and inevitable impurities, wherein a compositional ratio of CaO in oxide-based inclusions existing in a steel sheet defined by the following equation (1):

$$CaO/(SiO_2+Al_2O_3+CaO) \qquad (1)$$

is not less than 0.4 and/or a compositional ratio of $Al_2O_3$ defined by the following equation (2):

$$Al_2O_3/(SiO_2+Al_2O_3+CaO) \qquad (2)$$

is not less than 0.3.

2. The non-oriented electrical steel sheet according to claim 1, characterized by including at least one element group of the following groups A-D:
   Group A: Ca: 0.0005-0.0100 mass %,
   Group B: one or two selected from Sn: 0.01-0.1 mass % and Sb: 0.01-0.1 mass %,
   Group C: one or two selected from Mg: 0.001-0.05 mass % and REM: 0.001-0.05 mass %, and
   Group D: one or more selected from Cu: 0.01-0.5 mass %, Ni: 0.01-0.5 mass % and Cr: 0.01-0.5 mass %,
in addition to the above chemical composition.

3. A method for producing a non-oriented electrical steel sheet by hot rolling a slab having a chemical composition as claimed in claim 2 to form a hot rolled sheet, cold rolling the hot rolled sheet without conducting a hot band annealing and subjecting to a finish annealing, characterized in that a compositional ratio of CaO in oxide-based inclusions existing in the slab defined by the following equation (1):

$$CaO/(SiO_2+Al_2O_3+CaO) \qquad (1)$$

is not less than 0.4 and/or a compositional ratio of $Al_2O_3$ defined by the following equation (2):

$$Al_2O_3/(SiO_2+Al_2O_3+CaO) \qquad (2)$$

is not less than 0.3, and a coiling temperature in the hot rolling is not lower than 650° C.

4. A method for producing a non-oriented electrical steel sheet by hot rolling a slab having a chemical composition as claimed in claim 2 to form a hot rolled sheet, cold rolling the hot rolled sheet after a hot band annealing and subjecting to a finish annealing, characterized in that a compositional ratio of CaO in oxide-based inclusions existing in the slab defined by the following equation (1);

$$CaO/(SiO_2+Al_2O_3+CaO) \qquad (1)$$

is not less than 0.4 and/or a compositional ratio of $Al_2O_3$ defined by the following equation (2):

$$Al_2O_3/(SiO_2+Al_2O_3+CaO) \qquad (2)$$

is not less than 0.3, and the hot band annealing is conducted at a temperature of 900-1150° C.

5. A method for producing a non-oriented electrical steel sheet by hot rolling a slab having a chemical composition as claimed in claim 1 to form a hot rolled sheet, cold rolling the hot rolled sheet without conducting a hot band annealing and subjecting to a finish annealing, characterized in that a compositional ratio of CaO in oxide-based inclusions existing in the slab defined by the following equation (1):

$$CaO/(SiO_2+Al_2O_3+CaO) \qquad (1)$$

is not less than 0.4, and/or a compositional ratio of $Al_2O_3$ defined by the following equation (2):

$$Al_2O_3/(SiO_2+Al_2O_3+CaO) \qquad (2)$$

is not less than 0.3, and a coiling temperature in the hot rolling is not lower than 650° C.

6. A method for producing a non-oriented electrical steel sheet by hot rolling a slab having a chemical composition as claimed in claim 1 to form a hot rolled sheet, cold rolling the hot rolled sheet after a hot band annealing and subjecting to a finish annealing, characterized in that a compositional ratio of CaO in oxide-based inclusions existing in the slab defined by the following equation (1):

$$CaO/(SiO_2+Al_2O_3+CaO) \qquad (1)$$

is not less than 0.4 and/or a compositional ratio of $Al_2O_3$ defined by the following equation (2):

$$Al_2O_3/(SiO_2+Al_2O_3+CaO) \qquad (2)$$

is not less than 0.3, and the hot band annealing is conducted at a temperature of 900-1150° C.

7. The non-oriented electrical steel sheet according to claim 1, wherein the steel sheet has an iron loss ($W_{15/50}$) of not more than 3.28 W/Kg and a magnetic flux density ($B_{50}$) of not less than 1.722 T.

8. The non-oriented electrical steel sheet according to claim 1, wherein the steel sheet has an iron loss ($W_{15/50}$) of not more than 3.05 W/Kg and a magnetic flux density ($B_{50}$) of not less than 1.726 T.

9. The non-oriented electrical steel sheet according to claim 1, wherein the steel sheet has an iron loss ($W_{15/50}$) of not more than 3.13 W/Kg and a magnetic flux density ($B_{50}$) of not less than 1.725 T.

* * * * *

UNITED STATES PATENT AND TRADEMARK OFFICE
CERTIFICATE OF CORRECTION

PATENT NO. : 10,822,678 B2
APPLICATION NO. : 15/541964
DATED : November 3, 2020
INVENTOR(S) : Tadashi Nakanishi et al.

Page 1 of 1

It is certified that error appears in the above-identified patent and that said Letters Patent is hereby corrected as shown below:

In the Claims

In Claim 1, Line 54, "than 0.0050 mass %, P: not more than 0.2 mass %, 5: not" should read -- than 0.0050 mass %, P: not more than 0.2 mass %, S: not --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*